United States Patent
Rink et al.

(10) Patent No.: US 6,913,285 B2
(45) Date of Patent: Jul. 5, 2005

(54) ADAPTIVE INFLATION PERFORMANCE USING MAGNETIC CHARACTERISTICS OF GASES

(75) Inventors: Karl K. Rink, Princeton, ID (US); David J. Green, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 93 days.

(21) Appl. No.: 10/446,449

(22) Filed: May 28, 2003

(65) Prior Publication Data

US 2004/0239087 A1 Dec. 2, 2004

(51) Int. Cl.[7] .............................................. B60R 21/26
(52) U.S. Cl. ........................ 280/736; 280/741; 280/742
(58) Field of Search ................................ 280/736, 737, 280/740, 741, 742; 102/530

(56) References Cited

U.S. PATENT DOCUMENTS

| | | | |
|---|---|---|---|
| 5,669,629 A | | 9/1997 | Rink |
| 5,799,972 A | * | 9/1998 | Handman et al. ............ 280/735 |
| 5,857,698 A | * | 1/1999 | Fuerst et al. ................. 280/737 |
| 5,884,938 A | | 3/1999 | Rink et al. |
| 5,941,562 A | | 8/1999 | Rink et al. |
| 6,032,979 A | | 3/2000 | Mossi et al. |
| 6,036,226 A | * | 3/2000 | Brown et al. ................ 280/736 |
| 6,039,347 A | * | 3/2000 | Maynard ...................... 280/736 |
| 6,189,927 B1 | | 2/2001 | Mossi et al. |
| 6,314,889 B1 | | 11/2001 | Smith |
| 6,332,404 B1 | | 12/2001 | Rink et al. |
| 6,601,872 B2 | * | 8/2003 | Zimbrich et al. ............ 280/737 |
| 6,789,820 B2 | * | 9/2004 | Meduvsky et al. .......... 280/742 |

* cited by examiner

*Primary Examiner*—Paul N. Dickson
*Assistant Examiner*—Toan C To
(74) *Attorney, Agent, or Firm*—Sally J. Brown

(57) ABSTRACT

An inflation system and method of operation are provided which utilize or employ the magnetic characteristics of certain gases to selectively alter or change one or more inflation characteristic of the inflation output provided thereby or resulting therefrom. An inflation system for providing a supply of inflation medium to an inflatable restraint element includes an inflator device having a first chamber having contents including a quantity of at least one gaseous material having magnetic characteristics. The inflation system also includes a magnetic field inductor in magnetic field change inducing communication with at least a portion of the first chamber contents quantity of the at least one gaseous material having magnetic characteristics, wherein activation of the magnetic field inductor effects a change in at least one inflation characteristic of the inflator device, e.g., rise rate, gas mass flow rate and pressure output, produced or generated by the inflator.

34 Claims, 4 Drawing Sheets

ADAPTIVE INFLATION PERFORMANCE USING MAGNETIC CHARACTERISTICS OF GASES

BACKGROUND OF THE INVENTION

This invention relates generally to gas generation, production or supply such as used for or in association with the inflation of inflatable devices such as inflatable vehicle occupant restraint airbag cushions used in vehicular inflatable restraint systems. More particularly, the invention relates to inflation systems such as for use in providing a supply of inflation medium to an inflatable restraint element and related methods of operation which employ or utilize magnetic characteristics of gases.

It is well known to protect a vehicle occupant using a cushion or bag, e.g., an "airbag," that is inflated or expanded with gas when the vehicle encounters a sudden deceleration, such as in the event of a collision. In such systems, an airbag cushion is normally housed in an uninflated and folded condition to minimize space requirements. Upon actuation of the system, the cushion begins to be inflated in a matter of no more than a few milliseconds with gas produced or supplied by a device commonly referred to as an "inflator."

Many types of inflator devices have been disclosed in the art for use in inflating one or more inflatable restraint system airbag cushions. Many prior art inflator devices include a solid form of gas generant material which reacts to produce or form gas used in the inflation of an associated airbag cushion.

A common form or type of prior art inflator device includes a gas generant material in a solid form and which solid gas generant material is caused to react to produce or form gas used in the inflation of an associated airbag cushion. For example, such inflators can generally produce or derive inflation gas via the combustion of a solid form gas generating material, i.e., a pyrotechnic. In practice, the combustion of such gas generating materials can typically also produce various undesirable combustion products, including various solid particulate materials. The removal of such solid particulate materials, such as by the incorporation of various filtering devices within or about the inflator, can undesirably increase inflator design and processing complexity as well as the costs associated with such inflator devices and associated processing. In addition, the temperature of the gases emitted from such inflator devices can typically vary between about 500° F. (260° C.) and about 1200° F. (649° C.), dependent upon numerous interrelated factors including the desired level of inflator performance, as well as the type and amount of gas generant material. Consequently, airbag cushions used in conjunction with such inflator devices are commonly constructed of or coated with special materials such as to desirably be resistant to such high temperatures. As will be appreciated, such specially fabricated or prepared airbag cushions are typically more costly to manufacture and produce.

Another category of inflator devices disclosed in the art for the inflation of one or more inflatable restraint system airbag cushions is often referred to as "compressed gas inflators." This category of inflator devices generally refers to those inflator devices which contain a selected quantity of compressed gas. For example, one particular type of compressed gas inflator, commonly referred to as a "stored gas inflator," simply contains a quantity of a stored compressed gas which is selectively released to inflate an associated airbag cushion. A second type of compressed gas inflator, commonly referred to as a "hybrid inflator," typically supplies or provides inflation gas as a result of combining a stored compressed gas with the combustion products resulting from the combustion of a gas generating material, e.g., a pyrotechnic.

In the past, compressed gas inflators of various types have commonly been at a disadvantage, as compared to pyrotechnic inflators, in terms of size, weight and/or cost. This is especially significant in view of the general design direction toward relatively small, lightweight and economical modem vehicle components and assemblies. Thus, there is a continuing need and demand for further improved apparatus and techniques for inflating inflatable devices such as inflatable airbag cushions.

A more recently developed type of inflator device is at least in part the subject of commonly assigned Rink, U.S. Pat. No. 5,669,629, issued 23 Sep. 1997; Rink et al., U.S. Pat. No. 5,884,938, issued 23 Mar. 1999; and Rink et al., U.S. Pat. No. 5,941,562, issued 24 Aug. 1999, the disclosures of which patents are hereby and expressly incorporated herein in their entirety. In one form of such recently developed inflator device, inflation gas is produced or formed, at least in part, via the decomposition or dissociation of a selected gas source material, such as in the form of a compressed gas and such as via the input of heat from an associated heat source supply or device. Such an inflator device is sometimes referred to as a "dissociative inflator."

In view of possibly varying operating conditions and, in turn, possibly varying desired performance characteristics, there is a need and a desire to provide what has been generally termed or referred to as an "adaptive" inflator device and a corresponding inflatable restraint system. With an adaptive inflator device, output parameters such as one or more of the quantity, supply, and rate of supply (e.g., mass flow rate) of inflation gas, for example, can be selectively and appropriately varied dependent on one or more selected operating condition such as ambient temperature, occupant presence, seat belt usage and rate of deceleration of the motor vehicle, for example.

Perhaps one of the simplest forms of a prior art adaptive inflation system is an inflation system which utilizes an inflator which provides two levels or stages of performance, e.g., commonly called or referred to as a "two-stage" or "dual stage" inflator. Various proposed or currently available dual stage inflator devices appear to be based on the principal of packaging together two separate inflators. As a result, such inflator combinations commonly include two distinct pressure vessels, two sets of filter or inflation gas treatment components, e.g., one for the output of each of the pressure vessels, and two distinct diffusers, again one for the output of each of the pressure vessels. Thus, it has been difficult to provide an adaptive inflator which will satisfactorily meet the size, cost and weight limitations associated with modern vehicle design, particularly as it pertains to driver side applications. Moreover, those skilled in the art will appreciate that even such a relatively simple two-stage inflator may require significantly sophisticated actuation and/or control systems, as compared to typical single stage inflators, in order to realize particularly desired adaptive performance capabilities.

Commonly assigned Rink et al., U.S. Pat. No. 5,941,562, issued 24 Aug. 1999 discloses an improved adaptive output inflator wherein inflator performance, such as measured by inflator gas output, can be appropriately varied and selected by appropriately varying and selecting the operational oxidant composition of the inflator.

While the devices and methods disclosed therein have in general at least in part been successful in satisfying the need and demand for improved adaptive output inflators and methods of inflation, there remains a continuing need and demand for further improved inflation systems and methods of operation such as may improve one or more of the safety, simplicity, effectiveness, economy, and reliability thereof, particularly as applied to adaptive inflation systems and operation.

SUMMARY OF THE INVENTION

A general object of the invention is to provide an improved inflation system for providing a supply of inflation medium to an inflatable restraint element and method of operation.

A more specific objective of the invention is to overcome one or more of the problems described above.

The general object of the invention can be attained, at least in part, through an inflation system for providing a supply of inflation medium to an inflatable restraint element. The inflation system includes an inflator device having a first chamber. The first chamber has contents including a quantity of at least one gaseous material having magnetic characteristics. The inflation system also includes a magnetic field inductor in magnetic field change inducing communication with at least a portion of the first chamber contents quantity of the at least one gaseous material having magnetic characteristics. In accordance with one preferred practice of the invention, activation of the magnetic field inductor effects a change in at least one inflation characteristic of the inflator device.

The prior art generally fails to provide an inflation system and method of operation wherein one or more of safety, simplicity, effectiveness, flexibility, economy and reliability is as great as may be desired. The prior art, more particularly, generally fails to provide an inflation system and method of operation wherein the magnetic characteristics of an inflation medium gas are employed to selectively vary the inflation characteristics of an inflator device.

The invention further comprehends a method for operating an inflator device. In accordance with one preferred embodiment of the invention, such a method involves placing a quantity of at least one gaseous material having magnetic characteristics in a first chamber of the inflator device and, subsequently, inducing a change in the magnetic characteristics of at least a portion of the quantity of the at least one gaseous material to effect a change in at least one inflation characteristic of the inflator device.

As used herein, references to an "adaptive" inflation system and the like are to be understood to refer to inflatable device inflation wherein selected inflatable devices are inflated or inflated in a manner generally dependent on selected operating conditions such as one or more of ambient temperature, occupant presence, seat belt usage, seat position of the occupant and rate of deceleration of the motor vehicle, for example.

References herein to the detection or sensing of "occupant presence" are to be understood to refer to and include detection and sensing of one or more of the size, weight, and/or positions of a particular occupant under consideration.

References herein to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

References herein to an "inflation characteristic" of an inflator or like device generally refer to one or more of the rise rate, gas mass flow rate and pressure output, e.g., maximum pressure ($P_{MAX}$), produced or generated by the inflator.

References herein to the "rise rate" produced by or resulting from an inflator device generally refer to the rate at which the output from the inflator device increases in pressure, as measured when such gas output is directed into a closed volume.

Reference herein to "$P_{MAX}$" generally refers to the maximum pressure that an inflator device generates or produces, as measured when the inflation output from the device gas is directed into a closed volume.

References herein to a "pyrotechnic" material are to be understood to generally refer to a material which in its simplest form, consists of an oxidizing agent and a fuel that produce an exothermic, self-sustaining reaction when heated to the ignition temperature thereof.

References herein to a specific composition, component or material as a "fuel" are to be understood to refer to a chemical which generally lacks sufficient oxygen to burn completely to $CO_2$, $H_2O$ and $N_2$.

Correspondingly, references herein to a specific composition, component or material as an "oxidizer" are to be understood to refer to a chemical generally having more than sufficient oxygen to burn completely to $CO_2$, $H_2O$ and $N_2$.

References herein to a material or pyrotechnic composition or the like as being "fuel-rich" or "rich in fuel" generally refers to such material as contains or includes fuel in a relative amount, as compared to the amount of oxidizer therein contained, in excess of the theoretical stoichiometric amount which will undergo complete combustion, based on the amounts of fuel and oxidizer therein contained.

Other objects and advantages will be apparent to those skilled in the art from the following detailed description taken in conjunction with the appended claims and drawings.

DETAILED DESCRIPTION OF THE INVENTION

Figure 1:
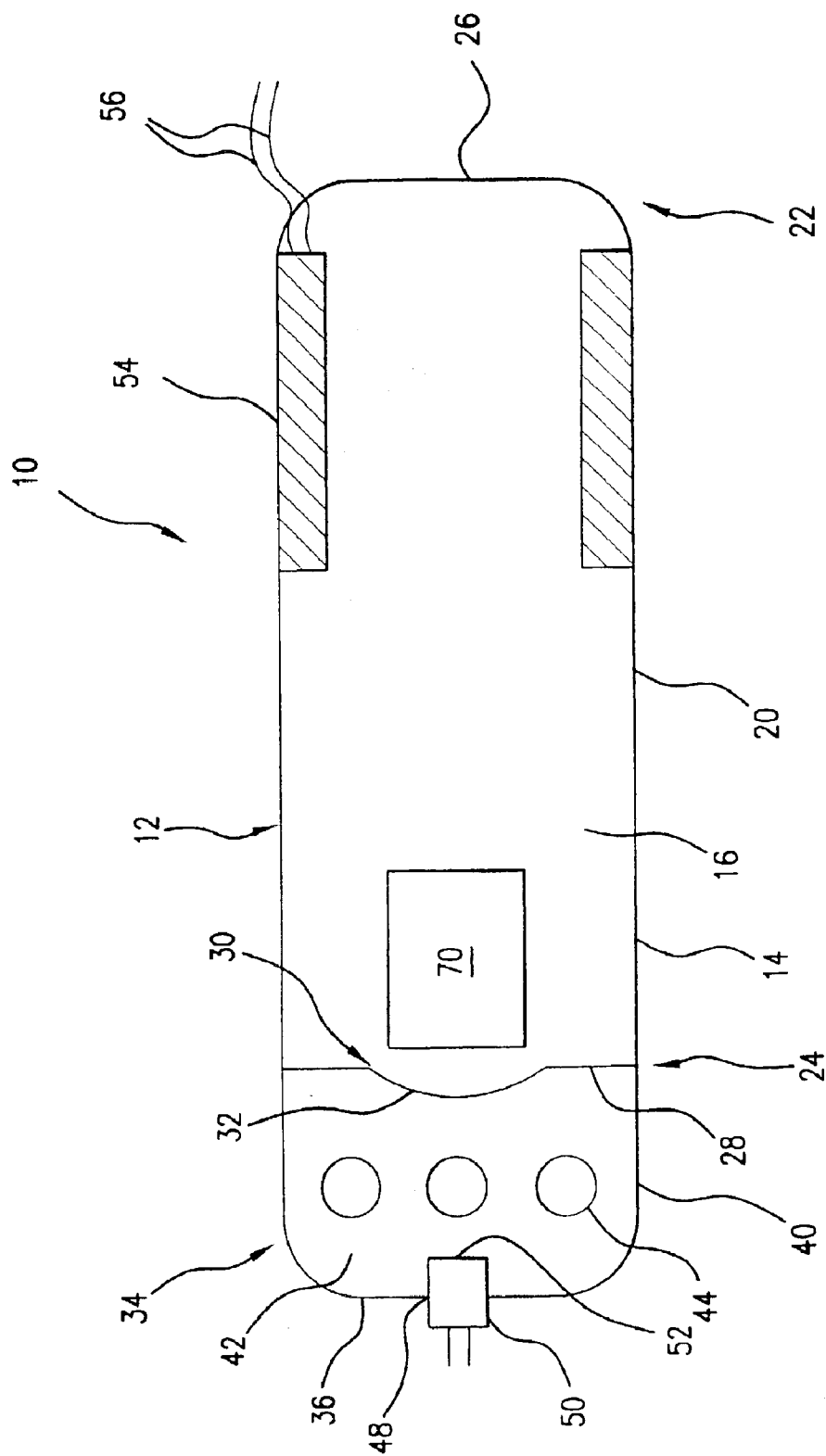
FIG. 1 is a simplified, partially in section, schematic drawing of a vehicle occupant safety assembly in accordance with one preferred embodiment of the invention.

The present invention may be embodied in a variety of different structures. As representative, FIG. 1 illustrates the present invention as embodied in an inflation system, more particularly, a gas generating device, generally designated by the reference numeral 10. While such gas generating devices may find various uses, the invention is believed to have particular utility for supplying gas such as may be used in the inflation of an inflatable vehicle occupant restraint, e.g., an inflatable airbag cushion, not shown. As identified above, such gas supplying devices are commonly referred to as inflators.

As more fully described below, the invention advantageously utilizes or employs gaseous materials having magnetic characteristics in inflator devices to desirably change or alter one or more inflation characteristic of the inflator device. Further, while the invention is described hereinafter with particular reference to an inflator for an airbag assembly such as for use in various automotive vehicles including vans, pick-up trucks, and particularly automobiles, it is to be understood that the invention also has applicability not only with various types or kinds of airbag module assemblies for automotive vehicles including driver, passenger, side impact, curtain and carpet airbag assemblies, for example, but also with other types of vehicles including, for example, airplanes, as well as possibly other inflation applications.

Returning to FIG. 1, the inflator 10 is an assembly that comprises a pressure vessel 12 at least in part forming a chamber 14. When the inflator 10 is in an at rest or static state, the chamber 14 is filled and pressurized with contents, here designated by the reference numeral 16, and which contents are more fully described below. In view thereof, the chamber 14 is sometimes hereinafter referred to as a "storage chamber."

The chamber 14 is generally defined at least in part by an elongated cylindrical sleeve 20 having a first end 22 and a second end 24. The sleeve first end 22 is closed by means of an end wall 26. The end wall 26 can be formed continuous and in one piece with the cylindrical sleeve 20, as shown. Alternatively, the end wall 26 can be appropriately joined to or connected with the cylindrical sleeve such as by means of a weld or other suitable means, as may be desired. The inflator assembly 10 also includes a wall portion or segment 28 at least partially closing the sleeve second end 24. The wall portion 28 includes an opening 30 therein. The opening 30 is normally closed by sealing means, e.g., such as by means of a burst or rupture disc 32 such as secured and joined thereto in sealing relation such as is known in the art.

An initiator and diffuser assembly combination 34 is joined or attached at the sleeve second end 24 in sealing relation such as by a weld, crimp or other suitable hermetic seal. The initiator and diffuser assembly combination 34 includes a base wall portion 36 and a side wall portion 40 extending therefrom. The initiator and diffuser assembly combination 34 also defines a diffuser chamber 42 and includes a plurality of diffuser orifices 44, formed in the sidewall portion 40, for dispensing inflation gas from the inflator 10 into an associated inflatable airbag cushion (not shown).

The base wall portion 36 includes or has an opening 48 therein, wherethrough an initiator device 50 is desirably attached in sealing relation, such as via a weld, crimp or other suitable seal. The initiator device 50 may, if desired, include or contain a load of a selected pyrotechnic charge which can be advantageous in providing a large heat input such as may be desired for certain associated reaction processing. The initiator device 50 includes a discharge end 52 whereat a discharge formed by the initiator device can be appropriately discharged or otherwise released.

A magnetic field inductor 54, with lead wires 56, is attached at, near to or adjacent the first end 22 of the elongated cylindrical sleeve 20. The magnetic field inductor 54 is shown located inside the storage chamber 14. However, a suitable magnetic field inductor may, if desired, be located outside the first chamber 14 or otherwise appropriately positioned such as to produce or result in a non-uniform magnetic field, such as described herein.

Suitable magnetic field inductors for use in the practice of the invention may include various types of devices such as can be actuated or otherwise selectively activated to produce, form or otherwise result in the formation of a magnetic field. More particularly, an example of one specific type or form of magnetic field inductor useable in the practice of the invention is an electromagnet whereby a non-uniform magnetic field can be activated such as by means of a switch.

As will be appreciated, the inside or outside placement of such a magnetic field inductor in accordance with particular preferred embodiments of the invention may have associated therewith certain advantages or benefits. For example, placement or positioning of the magnetic field inductor within the desired storage chamber may facilitate the desirable creation thereby of a strong non-uniform magnetic field within the chamber. On the other hand, placement or positioning of the magnetic field inductor outside of the desired storage chamber may desirably serve to avoid or minimize the creation of possible leak paths from the storage chamber as electrical connections (commonly referred to as "feedthroughs") to the magnetic field inductor within the storage chamber can be avoided.

As will be appreciated by those skilled in the art and guided by the teachings herein provided, the magnetic field inductor is desirably designed and positioned such as to create or result in a non-uniform magnetic field within the associated inflator device. For example, in the embodiment shown in FIG. 1, the magnetic field inductor 54 is desirably positioned such that there is a strong magnetic field within or at one portion of the inflator 10, here the inflator storage chamber first end 22, and a negligible magnetic field is created or present within or at another portion of the inflator 10, here the inflator storage chamber second end 24.

In the inflator assembly 10, an internal heater 70 is also shown disposed inside the storage chamber 14. In the illustrated embodiment, the internal heater 70 is generally disposed at or near the second end 24 of the elongated cylindrical sleeve 20 and away from the magnetic field inductor 54. In accordance with a preferred embodiment, the internal heater 70 may preferably contain or be composed of a pyrotechnic reactant. Those skilled in the art and guided by the teachings herein provided will however appreciate that the broader practice of the invention is not necessarily limited to the inclusion of an internal heater or the inclusion of an internal heater which contains or includes a pyrotechnic reactant as other types or forms of heater devices can, if desired, be used in the practice of the invention.

As identified above, the storage chamber 14 is filled and pressurized with contents 16. In accordance with one preferred embodiment of the invention, the storage chamber 14 contains at least one gaseous material (such as oxygen) having magnetic properties. In accordance with another preferred embodiment of the invention, the storage chamber 14 contains a pressurized gas mixture including at least one gaseous material (such as oxygen) having magnetic properties and at least one gaseous material free or relatively free of magnetic characteristics (as compared to the gaseous material, such as oxygen, having magnetic properties in accordance with the invention). In accordance with certain preferred embodiments of the invention, the storage chamber contents 16 include a quantity of nitrous oxide.

Most gases are "diamagnetic", meaning that these gases are not magnetic under normal conditions and only weakly magnetic, at best, when under the influence of powerful magnetic fields. Diamagnetic materials are popularly considered to be non-magnetic and are hereinafter sometimes referred to as being "free of magnetic characteristics". Further, diamagnetic materials though generally carrying no permanent magnetic moment, when under the influence of a magnetic field are generally repelled or repulsed by the field. In contrast, other materials, commonly termed "ferromagnetic", exhibit strong magnetic dipole moments under even ordinary conditions. Iron is an example of a ferromagnetic material. However, another category of materials, commonly termed "paramagnetic", exhibit noticeable magnetic dipole moments when exposed to magnetic fields of even only moderate strength, with paramagnetic materials being attracted to the field. Paramagnetic materials include gases such as oxygen and nitric oxide. As detailed below, the invention advantageously employs one or more gaseous materials having magnetic characteristics, e.g., a paramagnetic material, particularly an oxidant gas source such as oxygen, to desirably affect one or more inflation characteristic of the inflator device.

When the magnetic field inductor 54 is activated or in an "on" condition or state, a non-uniform magnetic field is generated in the gas mixture within the storage chamber 14. More particularly, the magnetic field inductor 54, when activated, will tend to attract gaseous materials having magnetic characteristics and repulse gaseous materials free of magnetic characteristics. As a result, gaseous materials having magnetic characteristics in accordance with the invention will concentrate in, at or near the inflator storage chamber first end 22 and gaseous materials free of magnetic characteristics will concentrate in, at or near the inflator storage chamber second end 24. When the magnetic field inductor 54 is inactivated or in an "off" condition or state, the contents of the storage chamber 14 will tend to mix together such that the gas concentration within the storage chamber 14 will, over time, become uniform.

As will be appreciated, magnetic field inductors used in the practice of the invention may alternatively be set or designed to be activated, e.g., "on", or inactivated, e.g., "off", when the inflator device is in the static state or at-rest condition, as may be desired in a particular application.

During activation of the inflator 10, such as upon the sensing of the occurrence of a collision, an electrical signal is sent to the initiator device 50. The initiator device 50 functions to rupture or otherwise open the burst disk 32. When the initiator device 50 is a pyrotechnic-containing initiator, the initiator device 50 discharges combustion products toward the burst disk 32. The burst disk 32 ruptures such that the storage chamber contents 16 are at least in part released from the storage chamber 14 and are passed into the diffuser chamber 42 and ultimately out the diffuser orifices 44 into an associated inflatable vehicle occupant restraint (not shown).

When the internal heater 70 contains or includes a pyrotechnic reactant, the pyrotechnic-containing initiator device 50 desirably produces a sufficient quantity of hot combustion particles to ignite the pyrotechnic reactant of the internal heater 70.

In accordance with one preferred embodiment of the invention, the internal heater 70 contains or includes a fuel-rich pyrotechnic reactant and the storage chamber contents 16 include a quantity of at least one gaseous material having magnetic characteristics (e.g., oxygen) as well as a quantity of one or more gaseous materials free of magnetic characteristics, such as an inert gas such as argon, for example.

In such an embodiment, when the magnetic field inductor 54 is inactivated or otherwise in an off state or condition, the oxygen will mix with the other gas or gases (e.g., argon) and will, over time, be in relatively uniform concentration throughout the storage chamber 14.

However, when the magnetic field inductor 54 is activated, the oxygen gas will be attracted thereto and thus towards the inflator storage chamber first end 22 and away from the internal heater 70, disposed or positioned at or near the inflator storage chamber second end 24. Consequently, the oxygen concentration in the gas mixture surrounding the internal heater pyrotechnic reactant will be low. As a result, a fuel-rich pyrotechnic reactant will be relatively slow to ignite and complete combustion of the fuel component of the internal heater pyrotechnic reactant will be delayed. Such operation will generally supply or provide an inflation medium at a relatively slow rate and hence will provide or result in a relatively slow "rise rate".

The invention has been described above making specific reference to a preferred embodiment relying on the incorporation and/or use of one or more gaseous materials having magnetic characteristics, e.g., a paramagnetic material, particularly an oxidant gas source such as oxygen, and at least one gaseous material free of magnetic characteristics. Those skilled in the art and guided by the teachings herein provided, however, will appreciate that the invention can, if desired, be practiced by employing gases having magnetic characteristics of different degrees or magnitudes.

Thus, the invention provides an inflator device of relatively simple construction and operation and wherein an inflation characteristic such as rise rate can desirably be relatively simply and easily manipulated. In particular, selective placement and choice of pyrotechnic gas generant can be used in association with inflator assemblies such as herein described to provide inflators having specific desired inflation or performance characteristics.

Those skilled in the art and guided by the teachings herein provided will, however, appreciate that thermal effects can impact the ability of a magnetic field to separate gases with differing magnetic susceptibilities. For example, for a tube exposed to a magnetic field gradient such that the magnetic intensity is $H_{max}$ at one end and negligible at the other end of the tube, the ratio of magnetic energy density to thermal density can be expressed as:

$$\frac{\text{Magnetic energy density}}{\text{Thermal energy density}} = \frac{(x_1 - x_2)\mu_0 H^2 / 2}{RMT/\rho} \quad (1)$$

Where:
  $x_1$, $x_2$=magnetic susceptibility of the gases 1 and 2, respectively
  H=magnetic field gradient
  $\mu_0$=magnetic moment
  $\rho$=mass density
  M=molecular weight of the gas mixture
  T=gas temperature
  R=Universal Gas Constant
  As will be appreciated, the efficiency of the process of separating gases 1 and 2 will generally correspond to the ratio of magnetic energy density to thermal energy density, with the separation process generally being more efficient when the ratio of magnetic energy density to thermal energy density is relatively large.

Figure 2:
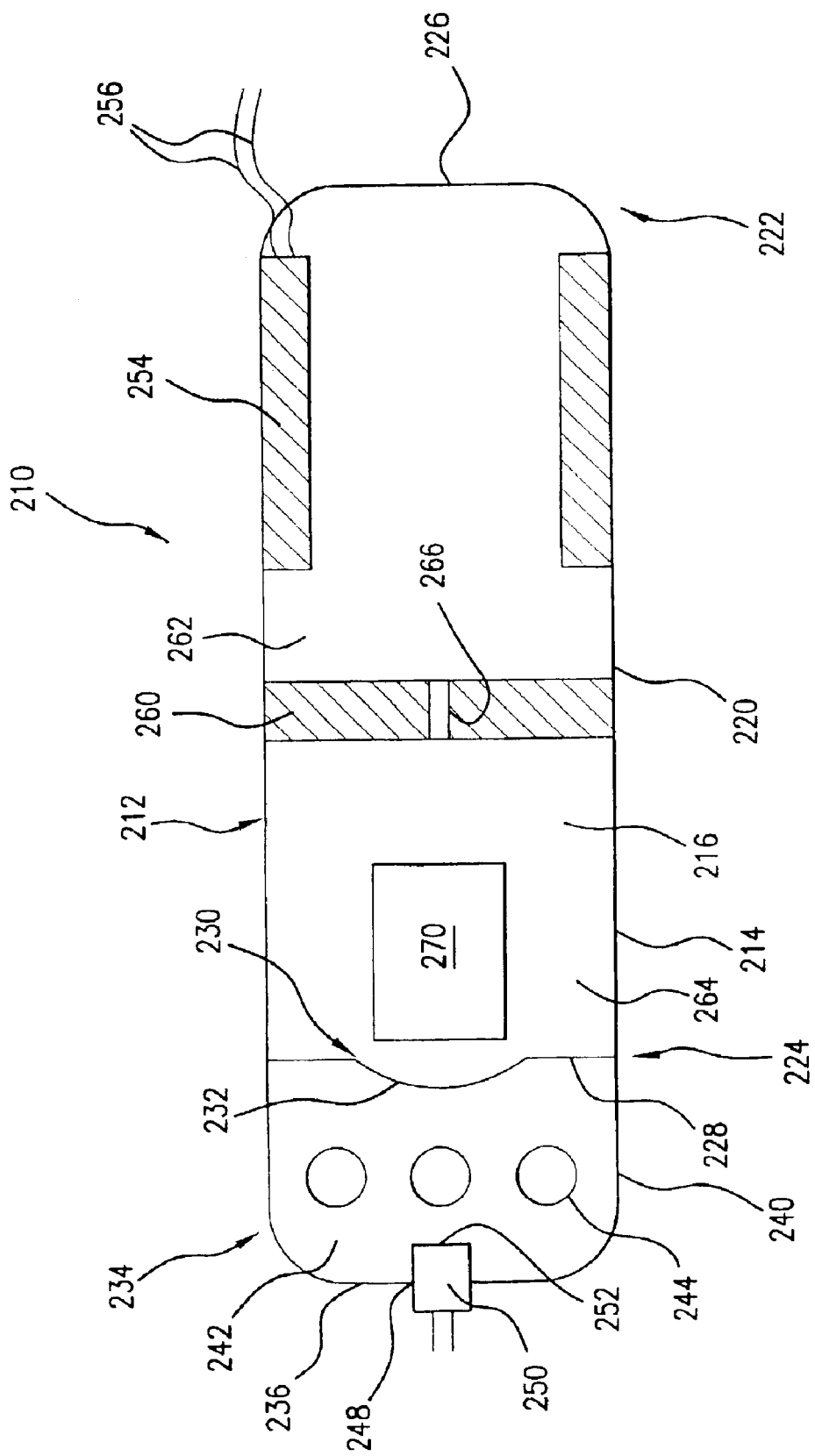
FIG. 2 is a simplified, partially in section, schematic drawing of a vehicle occupant safety assembly in accordance with an alternative preferred embodiment of the invention.

FIG. 2 illustrates an inflator assembly 210 specifically designed and adapted, in accordance with one preferred embodiment of the invention, to at least in part counter the possibly deleterious or undesired effects of thermal mixing The inflator assembly 210 is generally similar to the inflator assembly 10 shown in FIG. 1 and described above. For example, the inflator assembly 210, similar to the inflator assembly 10, comprises a pressure vessel 212 that at least in part forms a chamber 214, with contents designated by the reference numeral 216. The chamber 214 is generally defined at least in part by an elongated cylindrical sleeve 220 having a first end 222 and a second end 224. The sleeve first end 222 is closed by means of an end wall 226. The end wall 226 can be formed continuous and in one piece with the cylindrical sleeve 220, as shown. The inflator assembly 210 also includes a wall portion or segment 228 at least partially closing the sleeve second end 224. The wall portion 228 includes an opening 230 therein. The opening 230 is normally closed by sealing means, e.g., such as by means of a burst or rupture disc 232 such as secured and joined thereto in sealing relation such as is known in the art.

An initiator and diffuser assembly combination 234 is joined or attached at the sleeve second end 224 in sealing relation such as by a weld, crimp or other suitable hermetic seal. The initiator and diffuser assembly combination 234 includes a base wall portion 236 and a side wall portion 240 extending therefrom. The initiator and diffuser assembly combination 234 also defines a diffuser chamber 242 and includes a plurality of diffuser orifices 244, formed in the sidewall portion 240, for dispensing inflation gas from the inflator 210 into an associated inflatable airbag cushion (not shown).

The base wall portion 236 includes or has an opening 248 therein, wherethrough an initiator device 250 is desirably attached in sealing relation, such as via a weld, crimp or other suitable seal. As identified above, the initiator device 250 may, if desired, include or contain a load of a selected pyrotechnic charge which can be advantageous in providing a large heat input such as may be desired for certain associated reaction processing. The initiator device 250 includes a discharge end 252 whereat a discharge formed by the initiator device can be appropriately discharged or otherwise released.

The inflator assembly 210 also includes a magnetic field inductor 254, with lead wires 256, such as identified above and such as attached at, near to or adjacent the first end 222 of the elongated cylindrical sleeve 220, as detailed below.

The inflator assembly 210 primarily differs from the inflator assembly 10 through the inclusion of a barrier, here designated by the reference numeral 260. The barrier 260, such as in the form of a bulkhead or the like, is positioned within the pressure vessel 212 and serves to essentially separate the chamber 214 or otherwise form or create adjacent first and second chambers 262 and 264, respectively. As shown, the barrier 260 desirably contains or includes an opening 266 extending therethrough and through which opening fluid communication by and between the contents of the first and second chamber 262 and 264 can be realized.

The inflator assembly 210, similar to the inflator assembly 10, has or includes an internal heater 270. In accordance with a preferred embodiment, the internal heater 270 may preferably contain or be composed of a pyrotechnic reactant but other types or forms of heater devices can, if desired, be used in the practice of the invention. As shown, the internal heater is generally disposed inside the storage chamber 214, more specifically in the second chamber 264.

In accordance with a preferred embodiment of the invention, the barrier 260 is effective to at least in part limit gas flow communication between the first chamber 262 and the second chamber 264. For example, prior to activation of the magnetic field inductor 254, the storage chamber contents 216, such as including a gaseous material having magnetic characteristics (such as a paramagnetic oxidant gas source material such as oxygen) and another gas or gases free of magnetic characteristics, such as argon, will over time be in relatively uniform concentration throughout the storage chamber 214. However, when the magnetic field inductor 254 is activated, the oxygen gas will be attracted thereto and thus towards the inflator storage chamber first end 222 and into the first chamber 262. As will be appreciated, upon subsequent inactivation of the magnetic field inductor 254, the barrier 260 can desirably serve to slow or reduce subsequent diffusion or movement of oxygen gas from the first chamber 262 to the second chamber 264.

Figure 3:
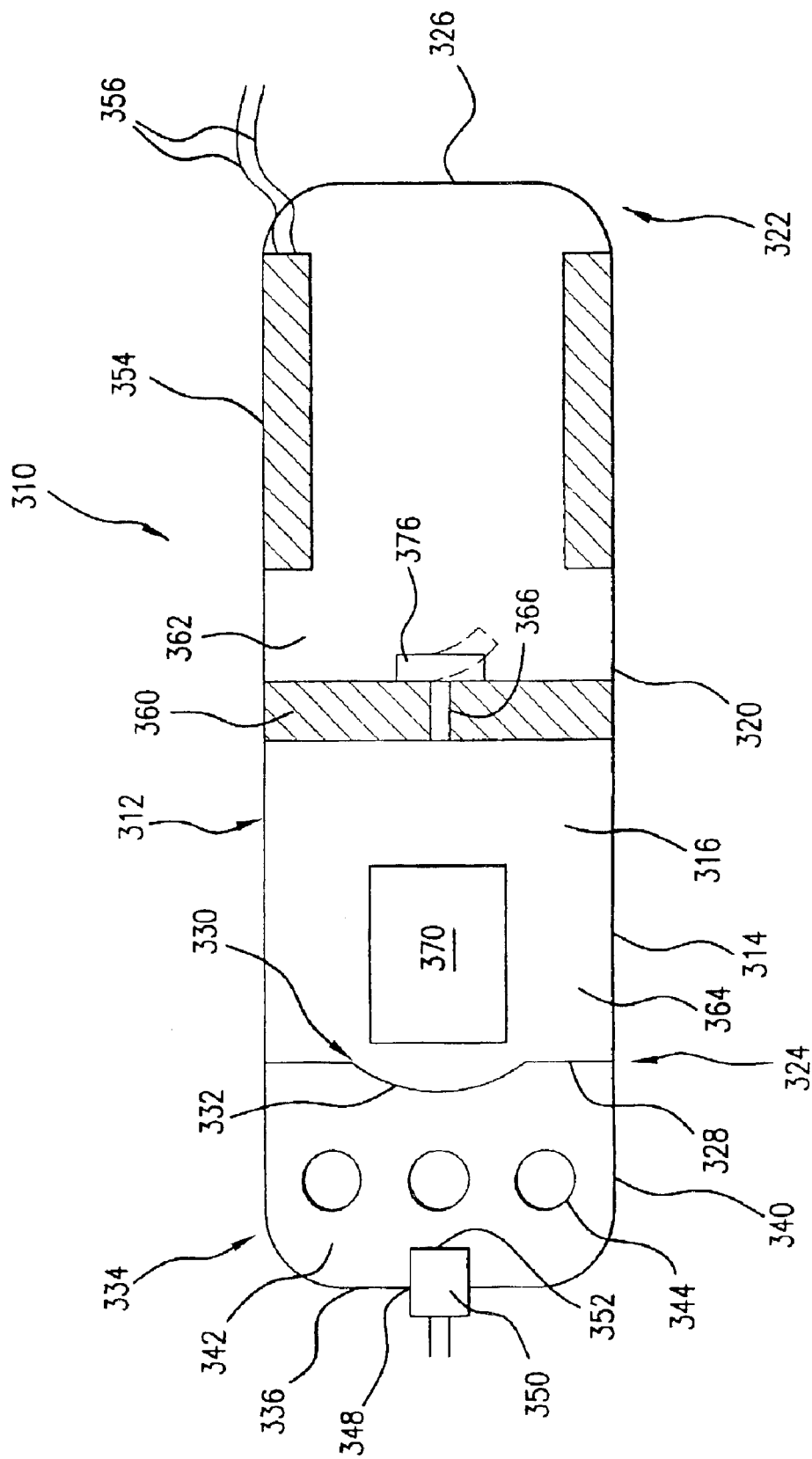
FIG. 3 is a simplified, partially in section, schematic drawing of a vehicle occupant safety assembly in accordance with another preferred embodiment of the invention.

FIG. 3 illustrates an inflator assembly 310, in accordance with one preferred embodiment of the invention, and generally similar to the inflator assembly 210 shown in FIG. 2 and described above. More particularly, the inflator assembly 310, similar to the inflator assembly 210, comprises a pressure vessel 312 that at least in part forms a chamber 314, with contents designated by the reference numeral 316. The chamber 314 is generally defined at least in part by an elongated cylindrical sleeve 320 having a first end 322 and a second end 324. The sleeve first end 322 is closed by means of an end wall 326. The inflator assembly 310 also includes a wall portion or segment 328 at least partially closing the sleeve second end 324. The wall portion 328 includes an opening 330 therein. The opening 330 is normally closed by sealing means, e.g., such as by means of a burst or rupture disc 332 such as secured and joined thereto in sealing relation such as is known in the art.

An initiator and diffuser assembly combination 334 is joined or attached at the sleeve second end 324 in sealing relation such as by a weld, crimp or other suitable hermetic seal. The initiator and diffuser assembly combination 334 includes a base wall portion 336 and a side wall portion 340 extending therefrom. The initiator and diffuser assembly combination 334 also defines a diffuser chamber 342 and includes a plurality of diffuser orifices 344, formed in the sidewall portion 340, for dispensing inflation gas from the inflator 310 into an associated inflatable airbag cushion (not shown).

The base wall portion 336 includes or has an opening 348 therein, wherethrough an initiator device 350 is desirably attached in sealing relation, such as via a weld, crimp or other suitable seal. As identified above, suitable initiator devices for use in the practice of the invention may, if desired, include or contain a load of a selected pyrotechnic charge which can be advantageous in providing a large heat input such as may be desired for certain associated reaction processing. The initiator device 350 includes a discharge end 352 whereat a discharge formed by the initiator device can be appropriately discharged or otherwise released.

The inflator assembly 310 also includes a magnetic field inductor 354 with lead wires 356, such as identified above and such as attached at, near to or adjacent the first end 322 of the elongated cylindrical sleeve 320, as detailed below.

The inflator assembly 310 also includes a barrier 360, such as in the form of a bulkhead or the like, positioned within the pressure vessel 312 and serving to essentially separate the chamber 314 or otherwise form or create adjacent first and second chambers 362 and 364, respectively. As shown, the barrier 360 desirably contains or includes an opening 366 extending therethrough and through which opening fluid communication by and between the contents of the first and second chamber 362 and 364 can be realized. Further, as with the inflator assembly 210 described above, the barrier 360 is effective to at least in part limit gas flow communication between the first and second chambers.

The inflator assembly 310, similar to the inflator assembly 210, has or includes an internal heater 370. In accordance with a preferred embodiment, the internal heater 370 may preferably contain or be composed of a pyrotechnic reactant but other types or forms of heater devices can, if desired, be used in the practice of the invention. As shown, the internal heater is generally disposed inside the storage chamber 314, more specifically in the first chamber 362.

The inflator assembly 310 primarily differs from the inflator assembly 210 through the inclusion of a restrictor, here designated by the reference numeral 376, adjacent or otherwise in operational communication with the opening 366 such as to selectively and desirably limit, control or prevent fluid flow communication through the opening 366. Suitable restrictors for use in the practice of the invention may take various forms or constructions including: a metallic strip (such as shown in FIG. 3); a semi-permeable membrane and a valve such as a standard electro-mechanical valve, for instance. Thus, those skilled in the art and guided by the teachings herein provided will appreciate that the broader practice of the invention is not necessarily limited to use of particular or specific forms or constructions of such flow restrictors.

In such an embodiment, the inflator assembly 310 works similarly to the inflator assemblies described above in that, as the magnetic field inductor 354 is energized, the gases separate. In this embodiment, however, upon deactivation of the inductor or, more importantly, firing of the initiator, the restrictor 376 serves or acts to inhibit or prevent immediate mixing of the entire gas charge. In particular, once the restrictor 376 has closed, fluid flow communication between the chambers 362 and 364 is restricted or prevented. Consequently, separated gases are no longer free to diffuse from the first chamber 362 to the second chamber 364 and the internal heater 370 therein contained. As a result, the effect of separation of the paramagnetic and diamagnetic gases (such as for burn rate modification, for example) can desirably be maintained for a longer or extended period of time. In view thereof, the ability to suitably modify or tailor inflator performance can be significantly enhanced or improved. In accordance with certain preferred embodiments, the restrictor, such as in the form of a thin metallic strip, as shown in FIG. 3. will act to impede the mixing of gases, but given a sufficiently strong pressure differential, will open or otherwise allow gases to flow or move between the chambers 362 and 364, through the opening 366.

Figure 4:
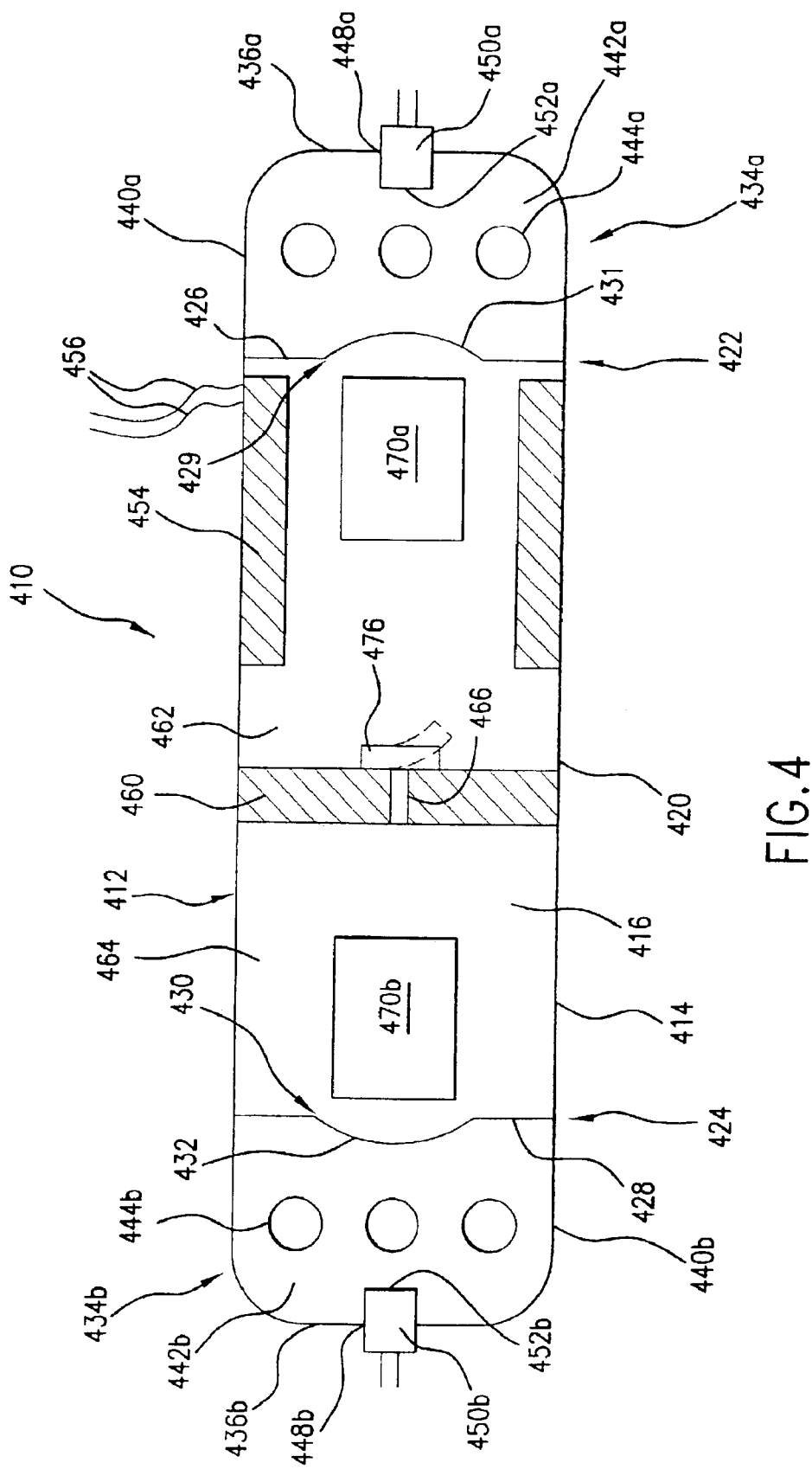
FIG. 4 is a simplified, partially in section, schematic drawing of a vehicle occupant safety assembly in accordance with yet another preferred embodiment of the invention.

FIG. 4 illustrates an inflator assembly, designated by the reference numeral 410, in accordance with another preferred embodiment of the invention. The inflator assembly 410 is generally similar to the inflator assembly 310 described above. More particularly, the inflator assembly 410, similar to the inflator assembly 310, comprises a pressure vessel 412 that at least in part forms a chamber 414, with contents designated by the reference numeral 416. The chamber 414 is generally defined at least in part by an elongated cylindrical sleeve 420 having a first end 422 and a second end 424. The sleeve first end 422 is at least partially closed by means of a first end wall portion or segment 426. The inflator assembly 410 also includes a second wall portion or segment 428 at least partially closing the sleeve second end 424. The first and second wall portions 426 and 428 each includes an opening therein, designated by the reference numerals 429 and 430, respectively. Each of the openings 429 and 430 is normally-closed by sealing means, e.g., such as by means of a burst or rupture disc 431 and 432, respectively, such as secured and joined thereto in sealing relation such as is known in the art.

A first initiator and diffuser assembly combination 434a is joined or attached at the sleeve first end 422 in sealing relation such as by a weld, crimp or other suitable hermetic seal. A second initiator and diffuser assembly combination 434b is joined or attached at the sleeve second end 424 in sealing relation such as by a weld, crimp or other suitable hermetic seal. The initiator and diffuser assembly combinations 434a and 434b each include a base wall portion 436a and 436b, respectively, and a side wall portion 440a and 440b, respectively, extending therefrom. Each of the initiator and diffuser assembly combinations 434a and 434b also defines a diffuser chamber 442a and 442b, respectively, and includes a plurality of diffuser orifices 444a and 444b, respectively, formed in the respective sidewall portion 440a and 440b, for appropriately dispensing inflation gas from the inflator 410 into an associated inflatable airbag cushion (not shown).

The base wall portions 436a and 436b each respectively includes or has an opening 448a and 448b therein, wherethrough a respective initiator device 450a and 450b is desirably attached in sealing relation, such as via a weld, crimp or other suitable seal. As identified above, suitable initiator devices for use in the practice of the invention may, if desired, include or contain a load of a selected pyrotechnic charge which can be advantageous in providing a large heat input such as may be desired for certain associated reaction processing. The initiator devices 450a and 450b each respectively includes a discharge end 452a and 452b whereat a discharge formed by the initiator device can be appropriately discharged or otherwise released.

The inflator assembly 410 includes a magnetic field inductor 454 with lead wires 456, such as identified above and such as attached at, near to or adjacent the first end 422 of the elongated cylindrical sleeve 420.

The inflator assembly 410 also includes a barrier 460, such as in the form of a bulkhead or the like, positioned within the pressure vessel 412 and serving to essentially separate the chamber 414 or otherwise form or create adjacent first and second chambers 462 and 464, respectively. As shown, the barrier 460 desirably contains or includes an opening 466 extending therethrough and through which opening fluid communication by and between the contents of the first and second chamber 462 and 464 can be realized. Further, as with the inflator assembly 310 described above, the barrier 460 is effective to at least in part limit gas flow communication between the first and second chambers.

The inflator assembly 410 has or includes a first internal heater 470a positioned or otherwise generally disposed within the first chamber 462 and a second internal heater 470b positioned or otherwise generally disposed within the second chamber 464. In accordance with a preferred embodiment, the internal heaters 470a and/or 470b may preferably contain or be composed of a pyrotechnic reactant but other types or forms of heater devices can, if desired, be used in the practice of the invention.

The inflator assembly 410 may, as shown, also include a restrictor 476 and such as described above, adjacent or otherwise in operational communication with the opening 466 such as to selectively and desirably limit, control or prevent fluid flow communication through the opening 466. As in the above-described embodiment, once the restrictor 476 has closed, fluid flow communication between the chambers 462 and 464 is prevented.

As will be appreciated, different pyrotechnic charges can be used for each of the internal heaters 470a and 470b. Preferably, the two charges are of different pyrotechnic formulations such as having or resulting in different response to an oxidant gas such as having magnetic characteristics. Those skilled in the art and guided by the teachings herein provided will appreciate that, for example, dependent upon the desired output response, an oxidant gas having magnetic characteristics can be specifically concentrated in the first chamber 462 or the second chamber 464, as may be desired for particular different desired inflation gas outputs. Thus, many different outputs are possible and realizable with an inflator assembly of relatively simple construction and operation.

The inflator assembly 410 represents one embodiment of an adaptive output inflator configuration that employs or utilizes the magnetic characteristics of gases in accordance with the invention. As such, the inflator assembly 410 can desirably provide various specific manners of operation and, therefore, many different specific possible inflator performance characteristics. For example, the initiator devices 450a and 450b can be selectively individually actuated or fired. Alternatively, the initiator devices 450a and 450b can be actuated or fired together or in some staggered sequenced pattern wherein one of the initiator devices 450a or 450b is first actuated or fired and then the other in the initiator devices is actuated or fired at a selected interval thereafter.

To further illustrate the practice of the invention, specific reference will now be made to a particular mode of operation of the inflator assembly 410, such as may be particularly useful or desired in association with a high speed vehicle crash on a hot day such as during which at least certain pyrotechnic materials tend to burn much more rapidly. It is to be understood, however, that the broader practice of the invention is not necessarily limited to such mode of operation and that the invention can desirably be practiced in accordance with other modes of operation dependent on factors such as the factors or conditions associated with the actuation of the inflator assembly.

With actuation of the magnetic field inductor 454, a paramagnetic gas is desirably drawn towards the region of high magnetic field strength, in this case the second chamber 462. Consequently, upon actuation of the initiator device 450a, a relatively lower temperature inflation gas is released from the inflator 410, as at least some of the oxygen is unavailable to the pyrotechnic charge of the internal heater 470b to permit it to burn rapidly at high temperature. In particular, the restrictor 476 may desirably serve to limit, control or prevent fluid flow communication through the opening 466. Thus, the inflator assembly 410 provides a first level of inflation performance such as appropriate or desired to decelerate an occupant contacting an airbag cushion inflated thereby.

Since the vehicle, however, was moving rapidly at the time of occurrence of the event necessitating the airbag cushion deployment, the initiator device 450b may desirably be actuated with the pyrotechnic charge of the internal heater 470a burning rapidly and high temperature with the available oxygen. Consequently, gas mass flow rate is increased, providing more gas more quickly to an associated airbag cushion, to further decelerate the occupant coming into contact with the airbag cushion in inflation communication therewith.

As will be appreciated, magnetic field inductors can desirably be turned on or off such as to consequently result in a timely desired non-uniform magnetic field. Thus, in accordance with one preferred embodiment of the invention the desired non-uniform magnetic field can be done or realized on demand. In practice, the actuation of the magnetic field inductor (and magnetic field strength) can desirably employ a safety restraint control system such as composed of a computer system such as used in the management of parameters such as temperature, vehicle speed, occupant position, occupant weight, seat belt usage, seat position, etc.

Further, while the invention has been described above making specific reference to embodiments wherein the magnetic field inductor is turned on or off such as to consequently result in a non-uniform magnetic field, those skilled in the art and guided by the teachings herein provided will appreciate that the broader practice fo the invention is not necessarily so limited. For example, the invention can, if desired, be practiced by simply desirably changing the magnetic field strength such as to desirably result in particular gas separation.

In view of the above, it will be appreciated that the invention provides a novel adaptive output inflator device and method which may desirably facilitate the selectively variable supply of inflation medium to an airbag such as may be necessary to protect the vehicle occupant.

Thus, the invention provides an improved inflation system and method of operation such as may improve one or more of the safety, simplicity, effectiveness, economy, and reliability thereof, particularly as applied to adaptive inflation systems and operation. More specifically, the invention provides such an improved inflation system and method of operation wherein the magnetic characteristics of an inflation medium gas are employed to selectively vary the inflation characteristics of an inflator device.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflation system for providing a supply of inflation medium to an inflatable restraint element, the inflation system comprising:

an inflator device having a first chamber, the first chamber having contents including a quantity of at least one gaseous material having magnetic characteristics and a magnetic field inductor in magnetic field change inducing communication with at least a portion of the first chamber contents including the quantity of the at least one gaseous material having magnetic characteristics, wherein activation of the magnetic field inductor effects a change in at least one inflation characteristic of the inflator device.

2. The inflation system of claim 1 wherein the at least one inflation characteristic of the inflator device affected by activation of the magnetic field inductor is rise rate.

3. The inflation system of claim 1 wherein the at least one inflation characteristic of the inflator device affected by activation of the magnetic field inductor is $P_{MAX}$.

4. The inflation system of claim 1 wherein the first chamber contents include nitrous oxide.

5. The inflation system of claim 1 wherein the at least one gaseous material having magnetic characteristics is paramagnetic.

6. The inflation system of claim 5 wherein the at least one paramagnetic gaseous material is an oxidant gas source.

7. The inflation system of claim 6 wherein the oxidant gas source paramagnetic gaseous material is oxygen.

8. The inflation system of claim 6 wherein the first chamber also contains a quantity of a first fuel-rich pyrotechnic reactant actuatable to produce first gaseous inflation medium products.

9. The inflation system of claim 1 wherein the first chamber contents also include at least one gaseous material free of magnetic characteristics.

10. The inflation system of claim 9 wherein the at least one gaseous material free of magnetic characteristics is an inert gas.

11. The inflation system of claim 10 wherein the inert gas is argon.

12. The inflation system of claim 1 wherein the magnetic field inductor is disposed within the inflator device.

13. The inflation system of claim 12 wherein the magnetic field inductor is disposed within the first chamber.

14. The inflation system of claim 12 wherein the magnetic field inductor comprises an electromagnet.

15. The inflation system of claim 1 additionally comprising a second chamber and a barrier between the first and second chambers effective to at least in part limit gas flow communication between the first and second chambers.

16. The inflation system of claim 15 wherein the second chamber houses the magnetic field inductor.

17. The inflation system of claim 15 wherein the barrier is actuatable to prevent gas flow communication between the first and second chambers.

18. The inflation system of claim 15 wherein the first chamber contains a quantity of a first fuel-rich pyrotechnic reactant actuatable to produce first gaseous inflation medium products and the second chamber contains a quantity of a second fuel-rich pyrotechnic reactant actuatable to produce second gaseous inflation medium products.

19. A method for operating an inflator device, the method comprising:

placing a quantity of at least one gaseous material having magnetic characteristics in a first chamber of the inflator device and inducing a change in the magnetic characteristics of at least a portion of the quantity of the at least one gaseous material to effect a change in at least one inflation characteristic of the inflator device.

20. The method of claim 19 wherein the at least one gaseous material having magnetic characteristics is paramagnetic.

21. The method of claim 20 wherein the at least one paramagnetic gaseous material is an oxidant gas source.

22. The method of claim 21 wherein the oxidant gas source paramagnetic gaseous material is oxygen.

23. The method of claim 19 wherein the at least one inflation characteristic of the inflator device affected by the inducing a change in the magnetic characteristics of at least a portion of the quantity of the at least one gaseous material is rise rate.

24. The method of claim 19 wherein the at least one inflation characteristic of the inflator device affected by the inducing a change in the magnetic characteristics of at least a portion of the quantity of the at least one gaseous material is gas mass flow rate.

25. The method of claim 19 wherein the at least one inflation characteristic of the inflator device affected by the inducing a change in the magnetic characteristics of at least a portion of the quantity of the at least one gaseous material is $P_{MAX}$.

26. The method of claim 19 wherein the first chamber contents include nitrous oxide.

27. The method of claim 19 wherein the at least one gaseous material having magnetic characteristics is paramagnetic.

28. The method of claim 27 wherein the at least one paramagnetic gaseous material is an oxidant gas source.

29. The method of claim 28 wherein the oxidant gas source paramagnetic gaseous material is oxygen.

30. The method of claim 19 wherein the inducing a change in the magnetic characteristics of at least a portion of the quantity of the at least one gaseous material comprises activating a magnetic field inductor in magnetic field change inducing communication with at least a portion of the first chamber contents quantity of the at least one gaseous material having magnetic characteristics.

31. The inflation system of claim 30 wherein the magnetic field inductor is disposed within the inflator device.

32. The inflation system of claim 30 wherein the magnetic field inductor is disposed within the first chamber.

33. The inflation system of claim 30 wherein activation of the magnetic field inductor effects a change in magnetic field strength.

34. The inflation system of claim 1 wherein the at least one inflation characteristic of the inflator device affected by activation of the magnetic field inductor is gas mass flow rate.

* * * * *